Feb. 21, 1928.

A. E. CARLSON 1,659,942

ROCK TUNNELING MACHINE

Filed Feb. 6, 1926

INVENTOR.

Anthony E. Carlson,

BY

Robt. D. Pearson

ATTORNEY.

Patented Feb. 21, 1928.

1,659,942

UNITED STATES PATENT OFFICE.

ANTHONY E. CARLSON, OF LOS ANGELES, CALIFORNIA.

ROCK-TUNNELING MACHINE.

Application filed February 6, 1926. Serial No. 86,630.

My invention relates to tunneling machines and more particularly to a machine for cutting and tunneling through rock.

The general object of my invention is to provide a fast, economical and highly efficient machine for cutting and tunneling through rock.

Other objects and advantages will appear hereinafter.

My invention is illustrated in the annexed drawing which forms a part of this specification and in which.

Corresponding reference characters designate the same parts in all the figures.

Figure 1:
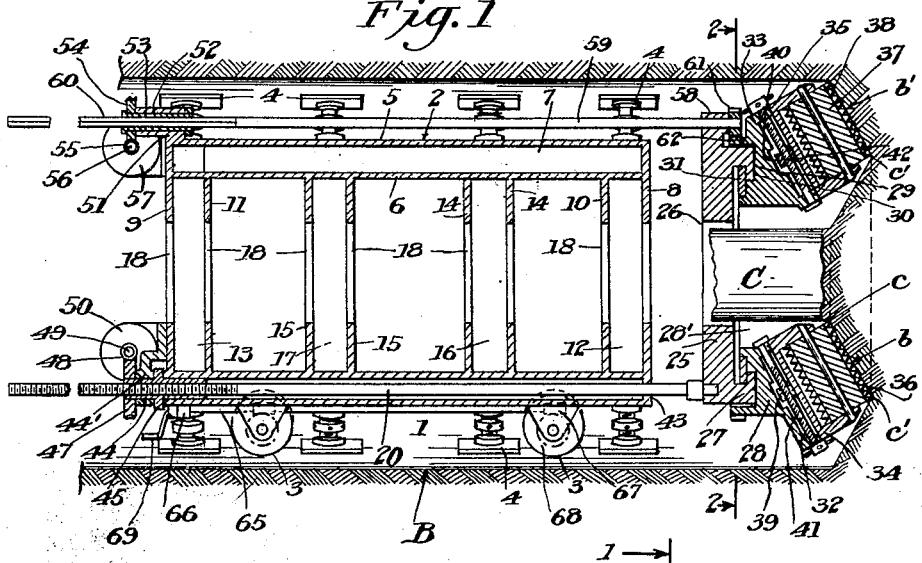
Fig. 1 is a vertical longitudinal section of my tunneling machine taken on line 1—1 of Fig. 3.
Figure 2:
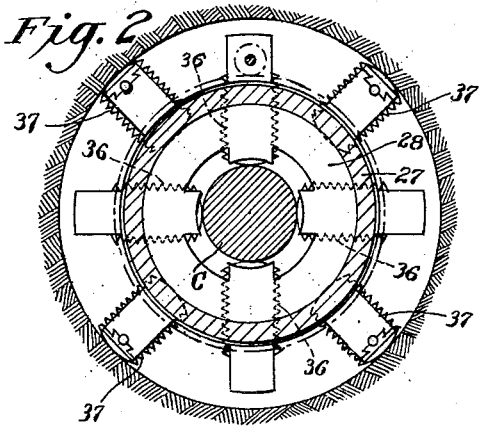
Fig. 2 is a transverse vertical section of my tunneling machine taken on line 2—2 of Fig. 1.
Figure 3:
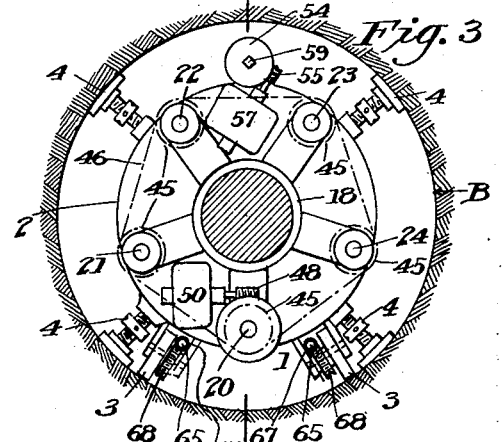
Fig. 3 is a rear end view of my tunneling machine.
Figure 4:
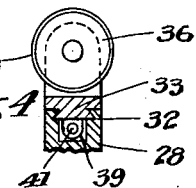
Fig. 4 is a transverse sectional view of one of the bits and its mounting taken on line 4—4 of Fig. 1.

In the drawing 1 designates a carriage including a cylindrical body 2 mounted on wheels 3 which are mounted about 60 degrees apart and radial to the center of the body, so as to travel along the lower wall of the bore B, cut by the machine, and maintain the body in axial coincidence with the bore. Radial screw jacks 4 are also mounted on the exterior of the body 2 about 90 degrees apart for engaging the bore and securing the carriage 1 in the bore at progressive points during the boring operation. The cylinder 2 is formed with an external cylindrical wall 5, an internal cylindrical wall 6 spaced within said external wall and forming a space 7 therebetween, end walls 8 and 9, walls 10 and 11 spaced inwardly from said end walls respectively and forming spaces 12 and 13 therebetween, and two pairs of partition walls 14 and 15, the walls of each partition being spaced and forming spaces 16 and 17 therebetween. The walls 8, 9, 10, 11, 14 and 15 are provided with central openings 18.

A plurality of screw rods 20, 21, 22, 23 and 24 spaced equi-distant apart extend longitudinally through the annular space 7 and the end walls 8 and 9 of the body 2 and carry on their forward ends a drill head 25 which is provided with a central opening 26 and is formed with an annular flange journal 27 on its forward side coaxial with the body and its openings 18. A bit head 28 is provided with a central opening 28' and an annular groove bearing 29 which receives the journal 27 whereby the bit head is journaled to turn on the drill head. The journal 27 may be formed at its outer end with an internal annular flange 30 and a ring 31 may be secured on the inner face of the bit head 25 for engaging the flange 30 to prevent the bit head pulling off the drill head.

The bit head 28 is formed with dovetailed ways 32 and 33 in which dovetailed bit bearings 34 and 35 are slidably mounted. In the bearings 34 and 35 are journaled rotary bits 36 and 37 respectively formed with spaced annular cutting edges 38. The ways 32 and 33 are arranged at oppositely disposed angles to the axis of the bit head so that the bit 36 will cut an external conical surface $b$ at the end of the bore from a small circle $c$ concentric with the bore B to a circle $c'$ midway between the circle $c$ and the circumference of the bore and will leave a concentric core C within the circle $c$, while the bit 37 will cut an internal conical surface $b'$ on the end of the bore from the circle $c'$ to the circumference of the bore. Threaded lugs 39 and 40 are formed on the bearings 34 and 35 and screws 41 and 42 are mounted in the ways 32 and 33 in engagement with said lugs respectively for adjusting the cutter 36 to cut a larger or smaller core C and for adjusting the cutter 36 to cut a larger or smaller core C and for adjusting the cutter 37 for cutting a larger or smaller bore B.

The screw rods 20 to 24 inclusive are journaled at their forward ends in bearings 43 in the front end wall 8 and extend through and are in threaded engagement at their rear ends with threaded sleeves 44 journaled in bearings 44' on the rear end of the body 2, on which sleeves are sprockets 45 over which extends a chain 46 so that when the sleeve engaging rod 20 is rotated all of the sleeves are turned and all of the rods 20 to 24 inclusive, together with the drill head 25, bit head 28 and the bits 36 and 37, are moved in or out with relation to the carriage 1. On the sleeve 44 which engages the rod 20, is formed a worm gear 47 which engages a worm 48 on the shaft 49 of a motor 50 mounted on the rear end of the carriage body 2.

On the rear end of the carriage body 2 in a bearing 51 is journaled a sleeve 52 provided with a square bore 53. On the sleeve 52 is formed a worm gear 54 which meshes with a worm 55 on the shaft 56 of a motor 57 mounted on the rear end of the carriage body 2. In a bearing 58 on the drill head 25 is journaled the forward end of a shaft 59, the rear end 60 of said shaft being square and in sliding engagement with the square bore 53 of the sleeve 52. On the forward end of the shaft 59 is secured a pinion 61 in mesh with a gear 62 on the bit head 28.

Shafts 65 are journaled in bearings 66 on the under side of the body 2, on which shafts are worms 67 which mesh with worm gears 68 on the wheels 3, and handles 69 are secured on the rear ends of said shafts for rotating the same and the wheels 3 through the medium of said worms and gears whereby the carriage is caused to travel in and out of the bore B.

The rotation of the sleeves 44 by the motor 50 moves the rods 20 to 24, drill head 25, bit head 28 and bits 36 and 37 forwardly for drilling when the carriage is secured in the bore by the jacks 4. By reversing the motor 50 the bits 36 and 37 may be withdrawn to advance the carriage for the next drilling operation of the bits.

While the bits are moved forward they are also rotated by the motor through the medium of the worm 55, worm gear 54, shaft 59, pinion 61, gear 62 and bit head 28. The core C passes through the openings 28' in the bit head 28, opening 26 in the drill head 25, and openings 18 in the body walls 8, 9, 10, 11, 14 and 15. The core may be easily broken off and removed from the machine.

Having thus described my invention what I claim is:

1. A tunneling machine comprising a carriage, a plurality of screw rods slidably journaled on said carriage, a plurality of sleeves journaled on the carriage in threaded engagement with said rods respectively, sprockets on said sleeves, a chain extending over said sprockets, a motor on said carriage, means whereby one of said sleeves is driven by said motor, a drill head mounted on the forward ends of said screw rods, a bit head rotatably mounted on said drill head, bits mounted on said bit head, a gear on said bit head, a pinion shaft having a square end, a pinion on said pinion shaft in mesh with said gear, a sleeve journaled on said carriage having a square bore through which the square end of said shaft extends, a second motor mounted on the carriage, and means whereby said sleeve is driven by said second motor.

2. A tunneling machine comprising a carriage, a plurality of rods slidably mounted on said carriage, means for moving said rods longitudinally, a drill head mounted entirely on the forward ends of said rods, a bit head rotatably mounted on said drill head, bits mounted on said bit head, a gear on said bit head, a pinion shaft journaled in said drill head and slidably mounted in the carriage, a pinion on said shaft in mesh with said gear, and means for rotating said pinion shaft.

3. A tunneling machine comprising a carriage, a plurality of screw rods slidably journaled on said carriage, a plurality of sleeves journaled on the carriage in threaded engagement with said rods respectively, sprockets on said sleeves, a chain extending over said sprockets, means for driving one of said sleeves, a drill head mounted entirely on the forward ends of said screw rods, a bit head rotatably mounted on said drill head, bits mounted on said bit head, and means for rotating said bit head.

4. A tunneling machine comprising a carriage, a plurality of screw rods slidably journaled on said carriage, a plurality of sleeves journaled on the carriage in threaded engagement with said rods respectively, sprockets on said sleeves, a chain extending over said sprockets, means for driving one of said sleeves, a drill head mounted on the forward ends of said screw rods, a bit head rotatably mounted entirely on said drill head, bits mounted on said bit head, a gear on said bit head, a pinion shaft, a pinion on said pinion shaft in mesh with said gear, and means for rotating said pinion shaft.

In testimony whereof I hereunto affix my signature.

ANTHONY E. CARLSON.